US012331766B2

(12) United States Patent
Wahler et al.

(10) Patent No.: US 12,331,766 B2
(45) Date of Patent: Jun. 17, 2025

(54) METHOD FOR OPERATING A HYDRAULIC DRIVE

(71) Applicant: Robert Bosch GmbH, Stuttgart (DE)

(72) Inventors: Matthias Wahler, Altfeld (DE); Henning Freigang, Lohr am Main (DE); Thomas Sendelbach, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 17/504,890

(22) Filed: Oct. 19, 2021

(65) Prior Publication Data
US 2022/0120297 A1 Apr. 21, 2022

(30) Foreign Application Priority Data

Oct. 21, 2020 (DE) ...................... 10 2020 213 262.3

(51) Int. Cl.
*F15B 21/08* (2006.01)
*G05B 19/46* (2006.01)

(52) U.S. Cl.
CPC .............. *F15B 21/08* (2013.01); *G05B 19/46* (2013.01); *F15B 2211/20515* (2013.01); *F15B 2211/27* (2013.01); *F15B 2211/6313* (2013.01); *F15B 2211/6336* (2013.01); *F15B 2211/6651* (2013.01); *F15B 2211/6653* (2013.01); *F15B 2211/7656* (2013.01)

(58) Field of Classification Search
None
See application file for complete search history.

(56) References Cited

U.S. PATENT DOCUMENTS

| 4,744,218 A * | 5/1988 | Edwards | G05B 19/414 60/368 |
|---|---|---|---|
| 2002/0140119 A1* | 10/2002 | Hofmann | B29C 45/76 425/149 |
| 2005/0051024 A1* | 3/2005 | Nielsen | F15B 11/044 91/462 |
| 2018/0185900 A1* | 7/2018 | Otto | B21J 7/46 |

FOREIGN PATENT DOCUMENTS

| DE | 10 2010 021 000 A1 | 11/2011 | |
|---|---|---|---|
| DE | 10 2011 120 767 A1 | 6/2013 | |
| DE | 10 2013 006 137 A1 | 10/2014 | |
| DE | 102016223099 A1 * | 5/2018 | ............. B29C 45/82 |
| DE | 102017213650 A1 * | 1/2019 | |
| DE | 10 2018 211 738 A1 | 1/2020 | |
| EP | 0 247 335 A2 | 12/1987 | |
| EP | 1 320 695 B1 | 3/2006 | |
| EP | 2 192 309 A2 | 6/2010 | |
| EP | 1 930 604 B1 | 5/2013 | |

\* cited by examiner

*Primary Examiner* — Mohammad Ali
*Assistant Examiner* — Joshua T Sanders
(74) *Attorney, Agent, or Firm* — Maginot, Moore & Beck LLP

(57) ABSTRACT

The disclosure relates to a method for operating a hydraulic drive which comprises a hydraulic consumer with a positionable piston in a cylinder which is connected to a tank at one connection via a pump of variable rotational speed and at another connection via a proportional valve, wherein a position of the piston is controlled using a model-based control in which a rotational speed of the pump is used as a manipulated variable and in which a position of the proportional valve is preset.

12 Claims, 2 Drawing Sheets

METHOD FOR OPERATING A HYDRAULIC DRIVE

This application claims priority under 35 U.S.C. § 119 to application no. DE 10 2020 213 262.3, filed on Oct. 21, 2020 in Germany, the disclosure of which is incorporated herein by reference in its entirety.

TECHNICAL FIELD

The present disclosure relates to a method for operating a hydraulic drive which comprises a hydraulic consumer with a positionable piston in a cylinder, and also to a computing unit and to a computer program for carrying it out.

BACKGROUND

An electrohydraulic axle is a hydraulic drive having a pump (which is operated as a rule by means of an electric motor or drive) and a hydraulic cylinder in which an electric or electronic control of, for example, the position of the cylinder piston is possible. Such electrohydraulic axles are used, for example, for so-called deep-drawing presses, injection-molding machines or else in other forming technology machines, just as, for example, for moving heavy loads or machine parts.

Usually provided in such electrohydraulic axles are substitutional force-position controls, that is to say that, for example, depending on the operating point, a force control or a position control takes place. Instead of a force control there can also be provided a pressure control, which are equivalent on account of the relationship between force and pressure over the application area of the pressure, for example in a hydraulic cylinder.

In such controls it is possible, for example, to make use of a valve for changing the volumetric flow of the hydraulic liquid into the cylinder or out of the cylinder. There can also occur a control of the rotational speed of the pump (or of the driving motor). The pump can take the form, in particular, of a constant displacement pump with fixed delivery volume or of a variable displacement pump with variable delivery volume per work cycle. For example, EP 1 930 604 B1 discloses a method in which a variable displacement pump with constant rotational speed is adjusted to a delivery flow or pressure. A brake valve can be actuated in dependence thereon.

SUMMARY

According to the disclosure, a method for operating a hydraulic drive and also a computing unit and a computer drive for carrying it out having the features of the disclosure are proposed. Advantageous embodiments form the subject matter of the following description.

The disclosure is concerned with a method for operating a hydraulic drive which comprises a hydraulic consumer with a positionable piston in a cylinder. As mentioned at the outset, in order to control a position of the piston, use can be made of a rotational speed of the pump as manipulated variable or a position of a valve for changing the volumetric flow of a hydraulic liquid into the cylinder or out of the cylinder. However, as has been shown, there are certain disadvantages in both variants. In the case of the rotational speed as manipulated variable, these are, for example, insufficient stiffness of the hydraulic drive, inaccurate positioning dynamics and a varying resonant frequency. In the case of the valve, these are, for example, power losses in the valve on account of the pressure drop in the valve, a nonlinear characteristic and likewise a varying resonant frequency.

Against this background, it is proposed that the hydraulic consumer, for example an electrohydraulic axle, is or has been connected to a tank at one connection (for example on the A side) via a pump of variable rotational speed and at another connection (for example on the B side) via a proportional valve. In the case of a hydraulic cylinder as hydraulic consumer, the latter has two chambers which are separated by the piston. Each chamber is here assigned to one of the connections (A side, B side). A position of the piston is then controlled using, or as part of, a model-based control in which a rotational speed of the pump is used as manipulated variable and in which a position of the proportional valve is preset. There is preferably used here an inverse system model of the hydraulic drive in order, using the proportional valve, to set, in particular adjust, a setpoint value for a (braking) force on the piston. In an inverse model, inputs and outputs are swapped; for example, volumetric flow and/or pressure as inputs of an inverse valve model can lead to a valve slide position as output. Here, the proportional valve is used in particular in a closed control loop, that is to say that also the setting of the slide in the valve can occur in a closed (subordinate) control loop with feedback of an actual value of the position. This makes it possible, on the one hand, to achieve a higher stiffness of the hydraulic drive and, on the other hand, also a particularly good energy efficiency.

Such a position control allows a particularly good and quick response to various phases or transitions between various phases during, for example, the operation of a casting cylinder. Moreover, such a control can be parameterized in a particularly simple and quick manner.

Here, the variables for which the actual values are required in this control are in particular the position of the piston and also the two pressures on the side of the two connections. These can be detected, for example, by means of suitable sensors. As part of the model-based control, the speed and acceleration of the piston can also be determined from the position thereof. There can then be determined therefrom in turn desired through-flow rates (volumetric flows) on the two sides—that is to say in one case, on the side of the pump (then to be designated there also as delivery flow) and in one case on the side of the proportional valve—which are then correspondingly preset. It should also be mentioned in this connection that, in a model-based control on the basis of a model of the system (here, as mentioned, in particular an inverse system model is used), a trajectory, that is to say profile of variables (in this case the position), can be precalculated. In the model-based control, control variables are also referred to as state variables, and state limitations can be taken into consideration. For a more detailed description of the model, reference should also be made to the description of the figures.

Preferably, in order to achieve (or realize) the setpoint value for the force of the piston—and hence the desired acceleration or braking action—a setpoint profile of the position of the proportional valve is therefore inferred via a planning of setpoint pressures in the hydraulic drive and resultant positions of the proportional valve.

Preferably, a feedforward control is carried out in a presetting (for example as part of a subordinate control) of the position of the proportional valve. It is expedient here to take into consideration a model-based pressure setpoint value as input and/or the dynamics of the proportional valve. Here, a model-based value for the through-flow rate of the proportional valve can increase the valve dynamics. Effectively, it is thus possible, for example, for the valve to be overcontrolled in order to bring the actual through-flow rate as close as possible to the model-based value. Whereas in underlying equations there is typically assumed an infinitely quick actuating member in the valve, such a feedforward control can reduce this error. Here, a model which is used for the proportional valve can in particular comprise a dynamic part which, possibly in a simplified manner, describes a slide position of the main stage or of the main valve and also limiting of the pilot valve (here, this is a control component for the main valve) with fixed system pressure. For example, a 2nd-order system (for example PT2 behavior) with state limitation can be assumed. It can also comprise an opening equation which describes the volumetric flow depending on the prevailing pressures on the main stage and the geometry characteristic.

The output of the feedforward control is a setpoint value for the valve position. Preferably, a feedforward control is carried out in the control of the position of the piston. Expediently taken into consideration here is a relationship between a through-flow rate (volumetric flow) of the cylinder and a state variable characterizing the movement of the piston, in particular a time derivative of the position (that is to say, for example, speed, acceleration and/or jerk). For the feedforward controls in the case of the piston and proportional valve, in particular different or separate state and/or actuating limitations can thus be taken into consideration. An output of the feedforward control is then preferably in each case a setpoint value for a volumetric flow of both connections (piston sides).

In the (inverse) system model used, preferably continuously differential trajectories for the flat output and its time derivatives are required for realizing the in particular flatness-based feedforward control. To generate a manipulated variable trajectory in real time, for example an extended low-pass filter algorithm can be used and the nonlinear (flat) dynamics and limitations of the flat state are taken into consideration. Such a method with real time trajectory planning with consideration of state and manipulated variable limitations is described, for example, in DE 10 2018 211 738 A1 and demonstrated there using the example of an axial piston pump. For more detailed explanations, reference should therefore be made to the description in that document.

In summary, there are thus the following particular advantages in the proposed control concept.

For the control of the cylinder (this relates to the position of the piston) and of the proportional valve there can be used in each case a feedforward control which also in each case takes into consideration different state and actuating limitations. In order to realize the acceleration setpoint value, a valve opening setpoint profile can be inferred via an extended planning of the setpoint pressures and via the resultant valve openings. By measuring a nonsensitive actual pressure on the A side (or on the side of the pump, not sensitive when it is not directly controlled, but depends on a memory, and the B side has only one engagement point), the model can be compensated online by the simplification made. By measuring or presetting (setpoint pressure in a pressure control of this chamber) of one chamber pressure, the other chamber pressure can be unambiguously derived. If the pressure buildup equation, which is controlled to preset the flat output, is not directly measured and fed back, the flatness of the overall system can be approximated as flat in the course of the dead times and measured value processing time. One comes here from an ambiguous solution to an exact solution for the position of the cylinder. The proposed method has, moreover, online or real time capability.

A further advantage is that the valve can be controlled in a considerably more dynamic manner than previously, namely, for example, instead of a response time of approximately 14 ms, only approximately 7 ms in the small-signal range. A nonflat system becomes nevertheless controllable by a feedforward control via the proposed method or the adaptation made therein.

In addition, as part of a monitoring on the basis of the model of the hydraulic drive, for example also certain values of variables can be compared with corresponding measured values, this being able to be carried out as a "condition monitoring". Moreover, the efficiency and precision can also be increased by means of a variable transmission ratio.

A computing unit according to the disclosure, for example a control device of a hydraulic axle, is configured, in particular in programming terms, to carry out a method according to the disclosure.

The implementation of a method according to the disclosure in the form of a computer program or computer program product with program code for carrying out all the method steps is also advantageous, since this entails particularly low costs, in particular if an executing control device is also used for other tasks and is therefore present in any case. Suitable data carriers for providing the computer program are in particular magnetic, optical and electrical memories, such as, for example, hard disks, flash memories, EEPROMs, DVDs, etc. A download of a program via computer networks (Internet, Intranet, etc.) is also possible.

Further advantages and embodiments of the disclosure will emerge from the description and the accompanying drawing.

It will be understood that the features mentioned above and those still to be explained below can be used not only in the respective indicated combination, but also in other combinations or in isolation, without departing from the scope of the present disclosure.

BRIEF DESCRIPTION OF THE DRAWINGS

The disclosure is schematically illustrated in the drawing on the basis of an exemplary embodiment and will be comprehensively described below with reference to the drawing.

DETAILED DESCRIPTION

Figure 1:
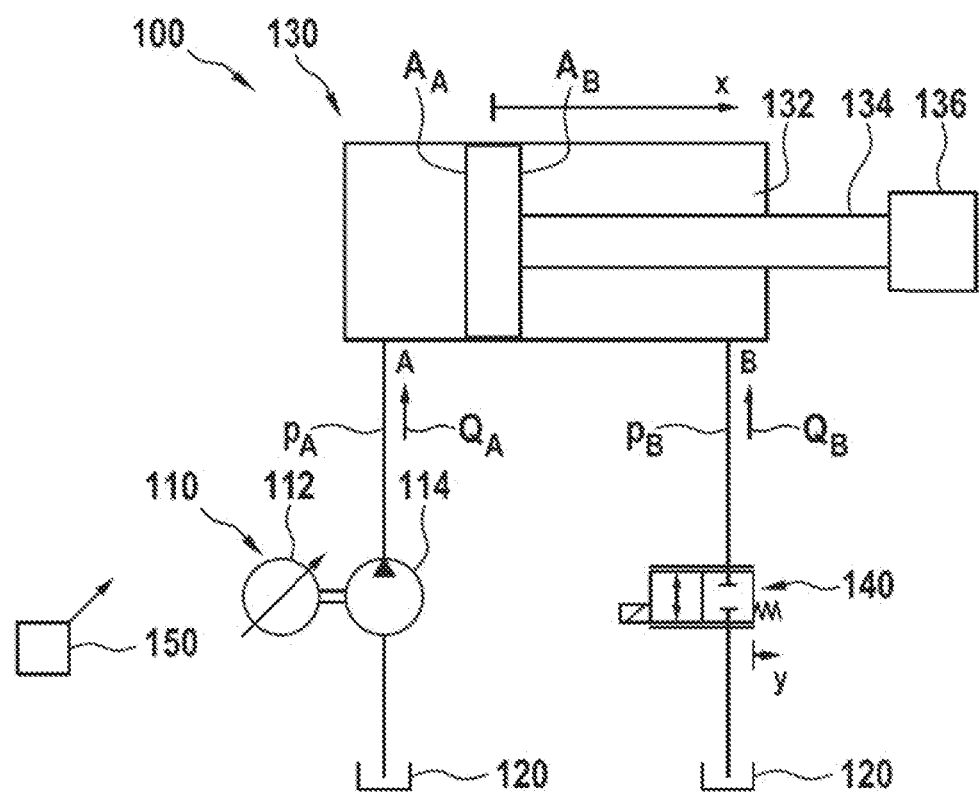
FIG. 1 schematically shows a hydraulic drive which is suitable for carrying out a method according to the disclosure.

In FIG. 1 there is schematically illustrated a hydraulic drive 100 in which a method according to the disclosure can be carried out, as will also be explained below. The hydraulic drive 100 has in the present case a pump 110 of variable rotational speed, comprising an electric motor or drive 112 (of variable rotational speed) and a delivery unit 114 coupled thereto. The pump 110 is, for example, an axial piston pump, embodied as a constant displacement pump, with fixed delivery volume for each work cycle.

Furthermore, the pump 110 is connected to a hydraulic consumer 130 which, in the present case, is a cylinder 132 with a positionable piston 134. A position of the piston or of a reference point there is designated by x. A load 136, for example, can be moved by means of the piston. The cylinder 132 is connected to a tank A for hydraulic fluid at a connection A via the pump 110 and at a connection B via a proportional valve 140. A position of a slide of the proportional valve 140 is designated by y.

In the cylinder 132 or on the piston 134, the A-side piston surface is designated by $A_A$, and the annular, B-side piston surface is designated by $A_B$. A pressure on the A side is $p_A$, and a pressure on the B side is $p_B$. A delivery flow or a through-flow rate into the or out of the cylinder 132 is designated on the A side by $Q_A$ and on the B side by $Q_B$.

It is possible via a computing unit 150, which takes the form of a control unit, for the electric motor 112 to be actuated, where appropriate via further components such as inverters or frequency converters, this likewise applying to the proportional valve 140. The hydraulic drive 100 can thus be used as an electrohydraulic axle. It will be understood that further pumps and/or valves can also be present at suitable points, but this is not absolutely necessary.

Figure 2:
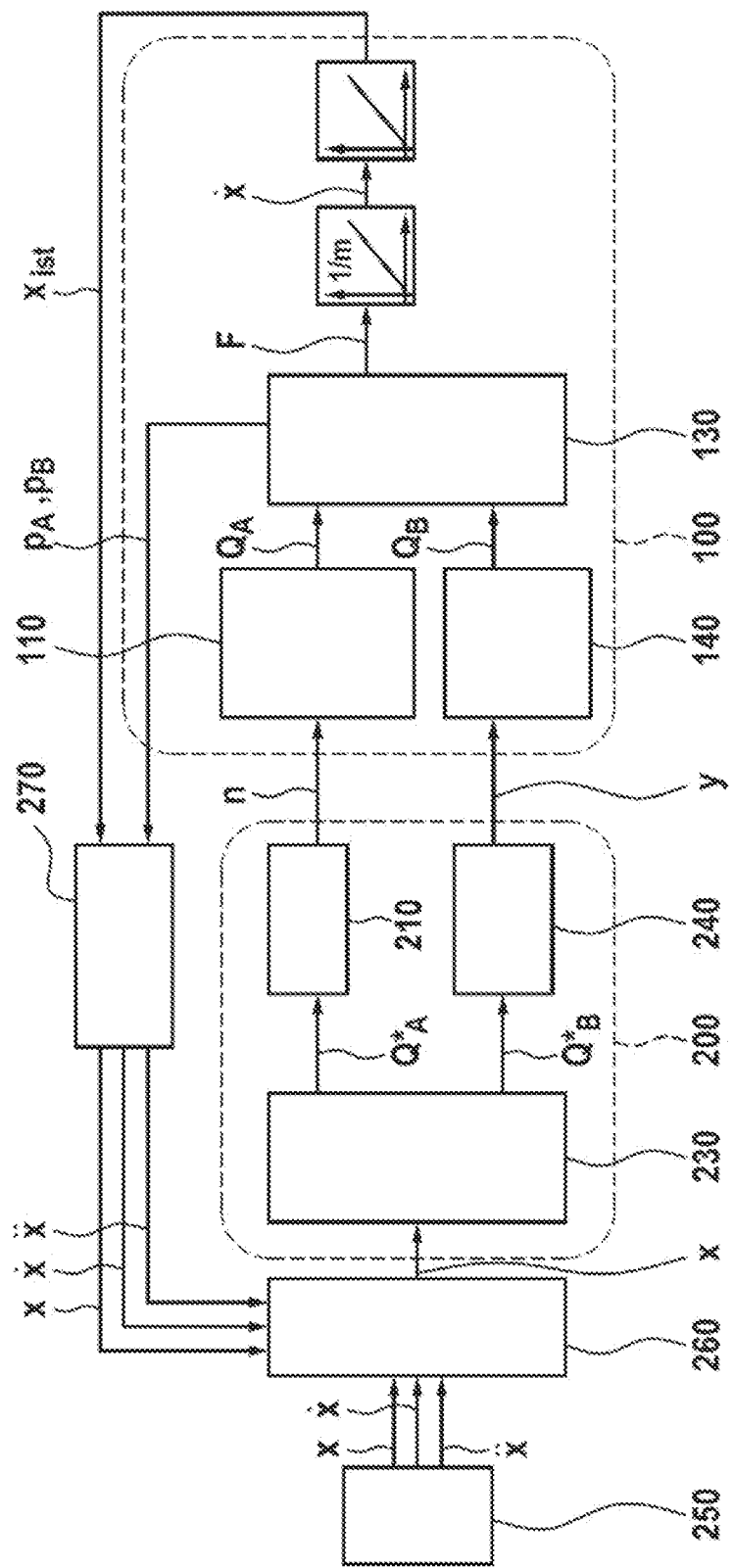
FIG. 2 schematically shows a sequence of a method according to the disclosure in a preferred embodiment.

In FIG. 2 there is schematically illustrated a sequence of a method according to the disclosure in a preferred embodiment. To control the position x of the piston, use is made of a state controller 260 which, for example, can be implemented on the computing unit 150 and which employs an inverse model or system model 200 of the hydraulic drive 100. In the model 200 there is a distinction in particular according to the relevant components of the hydraulic drive, that is to say there is a model 230 for the hydraulic consumer 130, a model 210 for the pump 110 and a model 240 for the proportional valve 140. Additionally provided is a state observer 270, as is a unit 250 (a so-called interpolator) for presetting setpoint values for state variables. It is possible by means of an interpolator to generate trajectories and their derivatives, that is to say a further method, in addition to, for example, nth-order low-pass filters.

By means of the unit 250 there can be preset setpoint values for state variables (a setpoint trajectory) which here comprise in particular the position x of the piston, but also their time derivatives $\dot{x}$ (speed) and $\ddot{x}$ (acceleration) (the setpoint trajectory should here be continuously differentiable n times). They are transferred to the state controller 260 which itself also obtains actual values of these state variables from the state observer 270. The latter in turn obtains as input variables the actual value $x_{ist}$ of the position x and also actual values of the pressures $p_A$ and $p_B$ and calculates therefrom actual values for $\dot{x}$ (speed) and $\ddot{x}$ (acceleration). Using the model 200 there are then determined, from the setpoint value for the position x, values for a rotational speed n of the pump 110 and a position y of the proportional valve 140 which are set or adjusted.

In the hydraulic drive 100, the rotational speed n and the position y are then converted into the delivery rate $Q_A$ or the through-flow rate $Q_B$, which results in a force F on the piston or the load 126. With the mass m of the moving mass (that is to say load 126 and piston 134) being taken into consideration, what results therefrom is also the speed and the position.

In the course of determining these values for the rotational speed n and the position y by means of the model 200, there are also determined model-based delivery flows or through-flow rates $Q_A^*$ and $Q_B^*$. In these model-based calculations there can be suitable (inverse) nonlinear state space representations which describe the hydraulic drive and allow a linearization along the setpoint trajectory.

An acceleration of the setpoint trajectory (which thus indicates the force on the piston) can here be converted, for example, into setpoint values $p_{A,soll}$ and $p_{B,soll}$ for the pressures. It is possible here, for example, to preset one of the two pressures, for example $p_{B,soll}$, which will then be established statically. It is thus possible to have influence on the pressure level and the stiffness of the hydraulic consumer. Although the stiffness cannot as a rule be directly influenced with a feedforward control, it is possible via pole presetting/impedance in the control in the state controller part to set the target stiffness by means of the controller.

Here, the through-flow rate $Q_B$, which is a function of the position y, that is to say that $Q_B=Q_B(y)$, can be achieved by the presetting of a position y of the proportional valve. The rotation speed in turn has an influence on the delivery flow $Q_A$. Here, $Q_B$ is a function of the states of the trajectory planning filter which are then inserted into the feedforward control function. Assuming that $p_A$ in this case behaves constantly or is measurable, the target valve opening (position y) can be calculated over time.

The invention claimed is:

1. A method for operating a hydraulic drive, the hydraulic drive including a hydraulic consumer having a positionable piston in a cylinder, the cylinder connected to a tank at a first connection via a pump of variable rotational speed and connected to the tank at a second connection via a proportional valve, the method comprising:
controlling a position of the piston using a model-based control process in which a rotational speed of the pump is a manipulated pump variable and in which a position of the proportional valve is preset; and
adjusting a setpoint value for the proportional valve by using an inverse system model of the hydraulic drive, wherein adjusting the setpoint value includes inferring, to achieve the setpoint value, a force on the positionable piston associated with the setpoint value using a setpoint profile of positions of the proportional valve from a planning of setpoint pressures in the hydraulic drive and from resultant positions of the proportional valve.

2. The method according to claim 1 further comprising:
carrying out a feedforward control in a presetting of the position of the proportional valve, as part of a subordinate control.

3. The method according to claim 2, the carrying out the feedforward control in the presetting of the position of the proportional valve further comprising:
carrying out the feedforward control taking into consideration at least one of (i) a model-based pressure setpoint value as input and (ii) dynamics of the proportional valve.

4. The method according to claim 1, the controlling the position of the positionable piston further comprising:
carrying out a feedforward control of the position of the positionable piston.

5. The method according to claim 4, the carrying out the feedforward control of the position of the positionable piston further comprising:
carrying out the feedforward control taking into consideration (i) a relationship between a through-flow rate of the cylinder and (ii) a state variable characterizing a movement of the positionable piston.

6. The method according to claim 5, the state variable being a time derivative of the position of the positionable piston.

7. The method according to claim 1, further comprising:
determining values of measured variables as part of a monitoring based on a model of the hydraulic drive; and comparing the determined values of the measured variables with corresponding measured values of the measured variables.

8. The method according to claim 1, wherein the pump of variable rotational speed is one of (i) a constant displacement pump and (ii) a variable displacement pump.

9. The method according to claim 1, wherein the hydraulic drive is used for an electrohydraulic axle.

10. The method according to claim 1, wherein the method is performed by executing a computer program on a computer.

11. The method according to claim 10, wherein the computer program is stored on a non-transitory machine-readable storage medium.

12. A computer for operating a hydraulic drive, the hydraulic drive including a hydraulic consumer having a positionable piston in a cylinder, the cylinder connected to a tank at a first connection via a pump of variable rotational speed and connected to the tank at a second connection via a proportional valve, the computer configured to:
- control a position of the piston using a model-based control process in which a rotational speed of the pump is a manipulated pump variable and in which a position of the proportional valve is preset; and
- adjust a setpoint value for the proportional valve by using an inverse system model of the hydraulic drive, wherein the adjusting the setpoint value includes inferring, to achieve the setpoint value, a force on the positionable piston associated with the setpoint value using a setpoint profile of the position of the proportional valve from a planning of setpoint pressures in the hydraulic drive and from resultant positions of the proportional valve.

* * * * *